(12) United States Patent
Tazzari et al.

(10) Patent No.: US 9,451,059 B2
(45) Date of Patent: *Sep. 20, 2016

(54) METHOD FOR TRANSMISSION OF INFORMATION BETWEEN NODES OF A NETWORK AND NETWORK USING SAID METHOD

(71) Applicant: ABB Technology AG, Zurich (CH)

(72) Inventors: Davide Tazzari, Arezzo (IT); Vernia Filippo, La Spezia (IT)

(73) Assignee: ABB Technology AG, Zurich (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/631,775

(22) Filed: Feb. 25, 2015

(65) Prior Publication Data

US 2015/0201049 A1 Jul. 16, 2015

Related U.S. Application Data

(63) Continuation of application No. 13/551,046, filed as application No. PCT/IT2005/000189 on Apr. 6, 2005, now Pat. No. 8,249,050.

(51) Int. Cl.
*H04L 29/08* (2006.01)
*H04L 12/721* (2013.01)
(Continued)

(52) U.S. Cl.
CPC ............ *H04L 69/324* (2013.01); *H04B 3/54* (2013.01); *H04L 45/00* (2013.01); *H04L 45/34* (2013.01); *H04L 45/44* (2013.01); *H04B 2203/5441* (2013.01); *H04B 2203/5466* (2013.01); *H04B 2203/5491* (2013.01)

(58) Field of Classification Search
CPC ............ H04B 2203/5441; H04B 2203/5491; H04B 2203/5466; H04B 3/54; H04L 45/34; H04L 45/00
See application file for complete search history.

(56) References Cited

U.S. PATENT DOCUMENTS 4,692,761 A * 9/1987 Robinton .................... 370/448
4,932,020 A * 6/1990 Pashan ................ H04L 49/555
370/218

(Continued)

FOREIGN PATENT DOCUMENTS

EP 507947 10/1992
EP 0852419 8/1998

(Continued)

OTHER PUBLICATIONS

"An International Standard" Journal of Telecommunication Networks, Computer Science Press Inc. Maryland, US vol. 3, No. 3, 1984, pp. 210-221, XP000670543.

*Primary Examiner* — Rasheed Gidado
(74) *Attorney, Agent, or Firm* — Patterson Intellectual Property Law, P.C.; Mark J. Patterson; Gary L. Montle (57) ABSTRACT

A method for communication between nodes (UR1; UR2; UC1-UC16) of a network, interconnected by a transmission channel and each identified by a node identification number in which at least one transmitter node emits at least one message to at least one message recipient node. The message comprises a description of a path (PH) between the transmitter node which emits the message and the message recipient node. The path is defined by the node that emits the message via a sequence of node identification numbers along the path itself.

8 Claims, 4 Drawing Sheets

(51) Int. Cl.
*H04B 3/54* (2006.01)
*H04L 12/701* (2013.01)

(56) References Cited

U.S. PATENT DOCUMENTS

| | | | |
|---|---|---|---|
| 5,473,602 A | | 12/1995 | McKenna et al. |
| 5,548,639 A | | 8/1996 | Ogura et al. |
| 5,649,108 A | * | 7/1997 | Spiegel et al. ............... 709/241 |
| 5,862,201 A | | 1/1999 | Sands |
| 6,067,567 A | | 5/2000 | Bartfai et al. |
| 6,212,185 B1 | * | 4/2001 | Steeves .................. H04L 45/00 370/392 |
| 6,751,196 B1 | | 6/2004 | Hulyalkar et al. |
| 7,313,596 B2 | | 12/2007 | Tani et al. |
| 7,639,603 B2 | | 12/2009 | Oda et al. |
| 2002/0036989 A1 | | 3/2002 | Payton |
| 2002/0085498 A1 | | 7/2002 | Nakamichi et al. |
| 2004/0151130 A1 | * | 8/2004 | Beshai et al. ................. 370/254 |

FOREIGN PATENT DOCUMENTS

| | | |
|---|---|---|
| WO | WO9205648 | 4/1992 |
| WO | WO9921147 | 4/1999 |
| WO | WO03010896 | 2/2003 |
| WO | WO03055031 | 7/2003 |
| WO | WO03088704 | 10/2003 |
| WO | WO2004088871 | 10/2004 |
| WO | WO2006106537 | 12/2006 |

* cited by examiner

METHOD FOR TRANSMISSION OF INFORMATION BETWEEN NODES OF A NETWORK AND NETWORK USING SAID METHOD

CROSS-REFERENCES TO RELATED APPLICATIONS

This application is a continuation of and claims benefit of U.S. patent application Ser. No. 13/551,046, filed Jul. 17, 2012, entitled "Method for Transmission of Information Between Nodes of a Network and Network Using Said Method," which is a continuation of U.S. patent application Ser. No. 11/910,828, filed Apr. 6, 2005, entitled "Method for Transmission of Information Between Nodes of a Network and Network Using Said Method, now issued as U.S. Pat. No. 8,249,050 on Aug. 21, 2012, and International Application No. PCT/IT2005000189, filed Apr. 6, 2005, now expired. Applicant claims benefit of each of the foregoing applications and incorporates them herein by reference in their entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This invention concerns in general the communication of messages, i.e. data packages, between nodes or units interconnected by a transmission channel, for example the nodes of an electrical network on which the nodes transmit messages by means of carrier waves.

WO-A-2004/088871 describes a method for transmission of messages between an information collecting unit and a plurality of control units, combined with electrical equipment, for example lighting points in an urban area. The method provides for a particular method of transmitting the messages also over long distances in the presence of noise on the transmission channel, which in said case is represented by the electrical distribution network.

U.S. Pat. No. 4,692,761 describes a method for the transmission of information from reading units combined with electricity meters to a collecting unit. Each node combined with a meter sends the meter reading information to a collecting node by means of a complicated system for determination of the message path. In practice, the emitter node sends the message to a node below, chosen from a plurality of possible nodes below. This node below that receives the message forwards it again to the collecting unit by means of an analogous procedure, i.e. by choosing a node below it from a plurality of possible nodes below. In practice, the message path is determined in an adaptive manner step by step according to the conditions of the line, for example according to the noise present on the various portions of the electrical network along which the messages are propagated by means of carrier waves. This system is obviously very complex.

BRIEF SUMMARY OF THE INVENTION

An object of this invention is to provide a method for the transmission of messages, i.e. data packages, which is easy to implement and at the same time suitable for transmitting data, as information or commands, also in complex networks, for example electricity distribution networks in urban areas with a very high number of nodes and interconnections, along a channel (represented by the same electrical network) which can have an impedance that varies over time and therefore unpredictable transmission conditions.

Substantially, the invention provides for a method for communication between nodes of a network, interconnected by a transmission channel and each identified by a node identification number, in which at least one transmitter node emits at least one message to at least one message recipient node, and in which the message comprises a description of a path between said transmitter node that emits the message and said message recipient node, said path being defined, by the node emitting the message, by means of a sequence of node identification numbers along said path.

A transmission method of this type can be implemented simply and efficiently to transmit data, information, commands or in general any type of message consisting of a bit package along an electricity distribution network, via carrier waves, over extensive distances from the transmitter node, and also in the presence of considerable interference on the network. Contrary to what occurs in other known systems, designed to transmit information on complex networks characterized by a high number of interconnections, in the method according to the invention the message is autodescriptive, i.e. a portion of it contains the entire description of the path it must follow to reach the recipient node. This description is provided by the sequence of the identification numbers of the nodes via which the message must pass to reach the recipient node. Since the distance between transmitter node and recipient node can be considerable, the nodes of the path regenerate the message by sending it to the next node defined by the path stored in the message.

To allow a node, which receives at random a message on the reception channel, to check whether it is the node to which said message must be delivered, or whether it must be regenerated via an echo, according to an advantageous embodiment of the invention the messages comprise an identification number of the next node along said path to which the message must be transmitted, said identification number of the next node identifying to which node of the path—defined in the message—said message must be transmitted. The content of the field defined as identification number of the next node is updated by each node that receives and retransmits the message (in the form of a reply or echo).

According to one embodiment of the invention the method provides for the following:
  when a message recipient node receives said message, it generates a reply message addressed to the node that emitted the "message and containing a description of the path from the" node that receives the message to the node that has emitted the message received;
  when a node different from the message recipient node receives a message in which the identification number of the next node is different from its own identification number, said node remains inert;

when a node receives a message in which the identification number of the next node corresponds to its own identification number, it generates an echo of the message, replacing the identification number of the next node with the identification number of the following node in the sequence of node identification numbers defining said path.

To permit checking of the progress of the message along the path described in it towards the recipient node, each node that receives a message from a node preceding it along the path defined in said message can advantageously send confirmation of reception of the message to said node preceding it. When a node does not receive a message of confirmation to its own message addressed to the following node along the path defined in said message, it can advantageously perform at least one attempt at transmission of the same message to the node which, along said path, is subsequent to the node from which the confirmation message has not been received. In fact, failure to receive the confirmation message can be due either to an impediment along the transmission line or to a fault in the adjacent node (which therefore cannot respond with a reception confirmation message). In the first case also the subsequent attempts to transmit the message beyond the node that does not reply will be unsuccessful, while in the second case the message may skip the faulty node and reach its destination all the same, when the conditions of the transmission line permit it, i.e. when the nodes are sufficiently close to each other or the line is sufficiently clean. After a certain number of attempts at transmitting the same message, to consecutive nodes along the path defined in a message, the node generates a message signaling interruption of the path addressed to the transmitting node, so that the transmitting node can attempt to send the same message to the same recipient node via a different alternative path.

According to an advantageous embodiment, particularly suitable in the case of complex networks with many nodes and multiple connections, a plurality of collecting nodes and a plurality of control nodes can be provided and said control nodes can be divided into a plurality of groups, each comprising a series of control nodes, each group being assigned to a collecting node and the collecting node interrogating via said messages the control nodes assigned to it.

The following can also be provided:
each control node of a group is also assigned to an additional collecting node;
if there are no faults on the collecting nodes, the control nodes of each group communicate with the respective main collecting node to which they are assigned;
in the event of a fault on said main collecting node, the collecting nodes assigned to it are re-assigned at least temporarily each to the respective additional collecting node.

This procedure guarantees the possibility of communication also in the event of a fault in one or more of the collecting nodes.

The control nodes can consist of control units combined with electrical or electronic equipment connected to an electric distribution network, for example in a building, a complex structure such as a hospital, an airport or an urban area. Typical electrical equipment combined with the control nodes can be lighting points powered by a distribution network. In said case the control nodes permit, via the respective control units, checking of correct operation of the electrical equipment combined with each node. The collecting nodes, with respective collecting units, can interrogate the individual control units combined with the respective control nodes and transmit to an alarm signal monitoring center in the event of a fault.

When the network is particularly complex, it can be advantageously described via a series of coverage equations, each of which defines a sequence of control nodes connected to one another and to a collecting node. The set of the coverage equations constitutes a topological description of said network.

The invention also concerns a network for the transmission of information between nodes interconnected by said network, characterized in that said nodes transmit messages via a method as defined above and better described below in a possible embodiment.

Further advantageous features of the invention are described in detail below with reference to implementation examples.

BRIEF DESCRIPTION OF THE SEVERAL VIEWS OF THE DRAWINGS

The invention will be better described by following the description and the attached drawings which show practical non-limiting embodiments of the invention. More specifically, in the drawing.

DETAILED DESCRIPTION OF THE INVENTION

Below an embodiment of a protocol is described in detail, useful for the transmission of information between nodes of a network, e.g. control unit and collecting unit in an electric energy distribution network, where such units are combined with electric or electronic appliances powered by the network and wherein the messages are transmitted by means of carrier waves on a channel represented by the electric distribution network. Here below the transmission protocol is described in an application to such a network, even though it should be understood that the method according to the invention has several applications. The collecting units combined with the collecting nodes interrogate the control units combined with the control nodes and the latter transmit information to the collecting units. The collecting units transmit then the information e.g. to a control center, via radio, GSM or the like.

Figure 1:
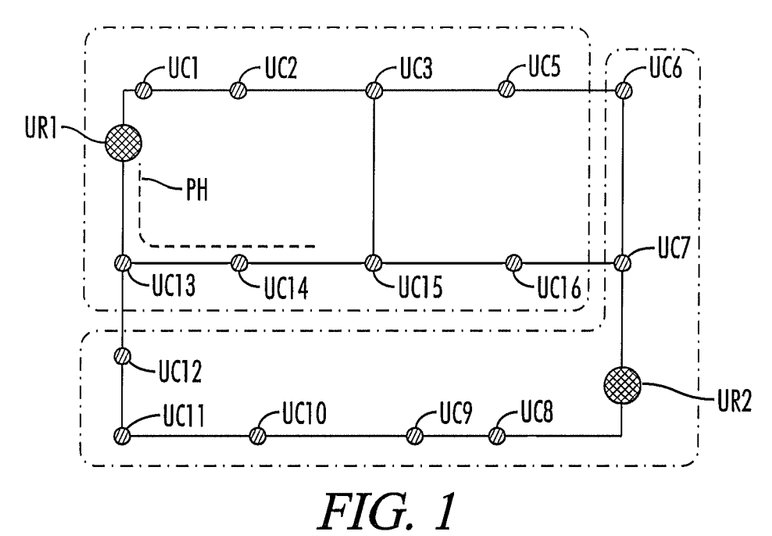
FIG. 1 shows a simplified example of a small network according to one embodiment of the invention, with two collecting units and plurality of meshes along which control units are distributed in the various nodes.

To illustrate operation of the transmission protocol, FIG. 1 shows, schematically a simple network with a limited number of nodes or points. However complex, an electricity distribution network can be represented as a network of interconnected nodes. The principles, described below with reference to the simple network of FIG. 1 can be applied analogously to extended networks.

FIG. 1 shows sixteen nodes UC1, . . . UC16 and two nodes UR1, UR2. These correspond to sixteen—control units 21 (UC), combined for example with as many electric or electronic appliances connected to the distribution network, and two collecting units (UR) combined for example with corresponding transformers from medium to low voltage which power the network or with other appliances combined with the network. Each unit, whether collecting or control, is assigned one univocal identification number.

Figure 2:
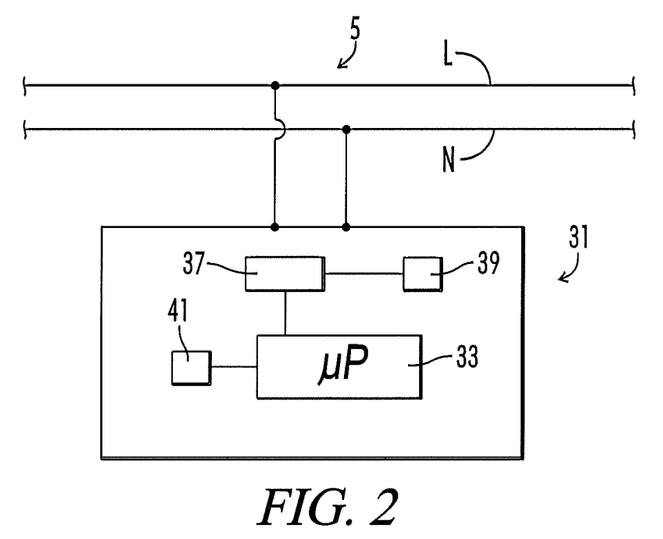
FIG. 2 shows a diagram of a control unit of a network according to an embodiment of the invention.

One embodiment of a collecting unit is shown in FIG. 2. The collecting unit 31 comprises a microprocessor 33 with a memory 41, powered by a power supply 37, which also powers (via the grid forming the network connecting the various nodes) a PLM (power line modem) 39 which communicates with the control units via carrier waves Lines, N on the distribution network 5.

Figure 3:
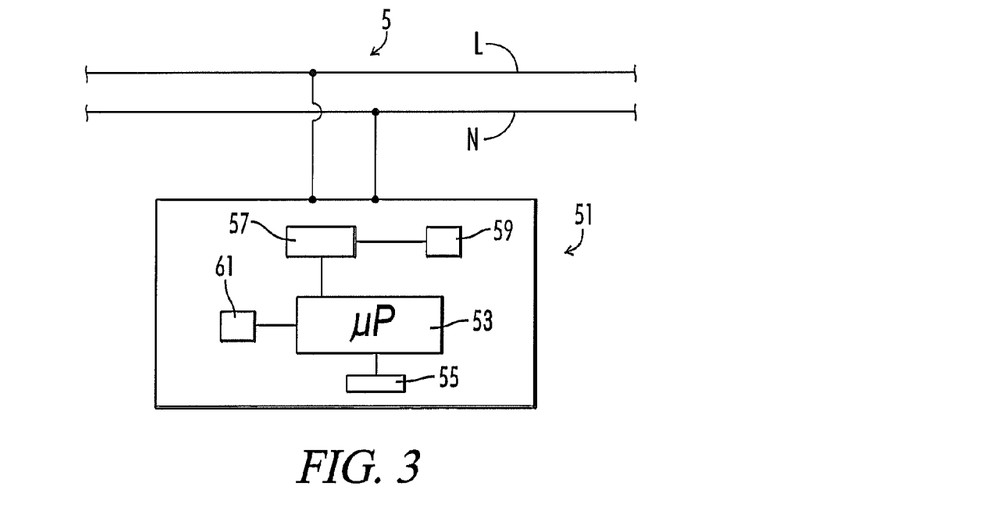
FIG. 3 shows a diagram of a collecting unit.

An embodiment of the collecting unit is schematically shown in FIG. 3 and indicated overall in said figure by 51. The collecting unit comprises a microprocessor 53 with a memory, 55, powered by a power supply 57, which also powers PLM 59 which communicates with the control unit via carrier waves, on Lines, N the distribution network 5. The collecting unit also provides for a transmitter 61 to communicate with a control center, for example via the GSM system or other.

As can be seen in this simple schematic example, the network comprises a plurality of different connections so that each node can be reached following different paths. To represent the topology of the network coverage equations are used, each of which represents a linear section of the network, defined via the nodes that belong to said portion. For example, in the case of FIG. 1 the following coverage equations can be used:

UR1-UC1-UC2-UC3  Eq 1:

UC3-UC5-UC6-UC7  Eq 2:

UC7-UR2  Eq 3:

UR2-UC8-UC9-UC10-UC11-UC12-UC13  Eq 4:

UC13-UR1  Eq 5:

UC13-UC14-UC15  Eq 6:

UC3-1 UC5  Eq 7:

UC15-UC16-UC7  Eq 8:

Furthermore, it can be observed that the various nodes UC_n are all connected to both the collecting units UR1 and UR2. In general, also for complex networks, for the various nodes in which the control units are arranged paths can be found that connect the nodes to several collecting units.

To optimize the message transmission times, it is advisable for the various nodes with the control units to be divided into coverage groups or lists, each of which is assigned mainly to one, of the collecting units. This, means that the nodes of a certain coverage list or group dialogue with one specific collecting unit and not with the others. For its part each collecting unit dialogues with the nodes represented by the control units of the coverage list (or coverage lists) assigned to it and not with others. Each coverage list is also assigned, secondarily, to at least one second collecting unit, as an alternative. As will be clarified below, this means that operation of the communication system can be maintained also in the event of a fault occurring in one of the collecting units.

In the schematic simplified example of FIG. 1 we can hypothetically divide the nodes, for example, into the following two coverage lists:

list 1: nodes UC1, UC2, UC3, UC5, UC13, UC14, UC15, UC16 list 2: nodes UC6, UC7, UC5, UC9, UC10, UC11, UC12.

Since in this simplified example there are only two collecting units, each coverage list is assigned secondarily to the other of the two collecting units.

Figure 4:
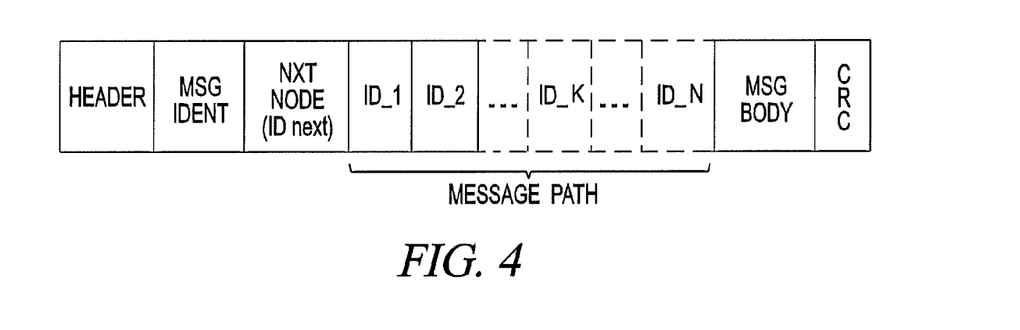
FIG. 4 shows schematically the structure of a message used for communication in a network of control and collecting units.

For transmission, the control and collecting units use messages that can have the structure schematized in FIG. 4. In the example illustrated each message comprises:

an initial part indicated as HEADER, which contains the bits identifying the beginning of a message to allow the receiver units to recognize the message, distinguishing it from the noise on the transmission line. The bits synchronizing and identifying the beginning of the message can be configured according to a known technique;

a message identification field, marked, "MSG IDENT" in the diagram, indicating a series of fields that permit correct identification of the message, for example: length of the message, coding of a command, characteristics of the message, a TTL (Time To Live) counter etc.;

a section indicated "MESSAGE PATH" consisting of a plurality of fields ID_1, ID_2 ... ID_K, ... ID_N, each of which contains the identification number of a node of the path that joins the node generating the message to the node to which the message is addressed. The identification numbers of the nodes are entered in the message in the sequential order in which the nodes are arranged along the path. The first identification number ID_1 is that of the node that generated the message, while the last identification number ID_N is that of the node to which the message is addressed; it therefore identifies the recipient of the message. This path is constructed by the node that generates the message, for example and typically one of the collecting units, on the basis of the coverage equations, as will be clarified by an example below. With this sequence of identification numbers of the nodes in the path, each message is self-defining, i.e. it contains the definition of the path it must follow to reach its destination;

a section indicated as ID_next, which contains the identification number of the next node, along the path, to which the message must be sent. At the moment when the message is generated and transmitted for the first time, the identification number ID_next corresponds to the first identification number in the "MESSAGE PATH" section. As the message moves forward by generation of successive echoes along the path defined in the message, the identification number ID_next is updated: each node that generates an echo updates it with the identification number of the next node present in the path description;

a body of the message, indicated by "MSG BODY", which can contain commands, information or other, the time of the message or further information or fields, and which can if necessary be constructed by adding fields during transmission of the message from one node to another, as will be clarified below;

a message validation field, indicated by CRC, which contains a validation code generated in a per se known manner, for example with a CRC (Cyclic Redundancy Check) algorithm or other.

Figure 5:
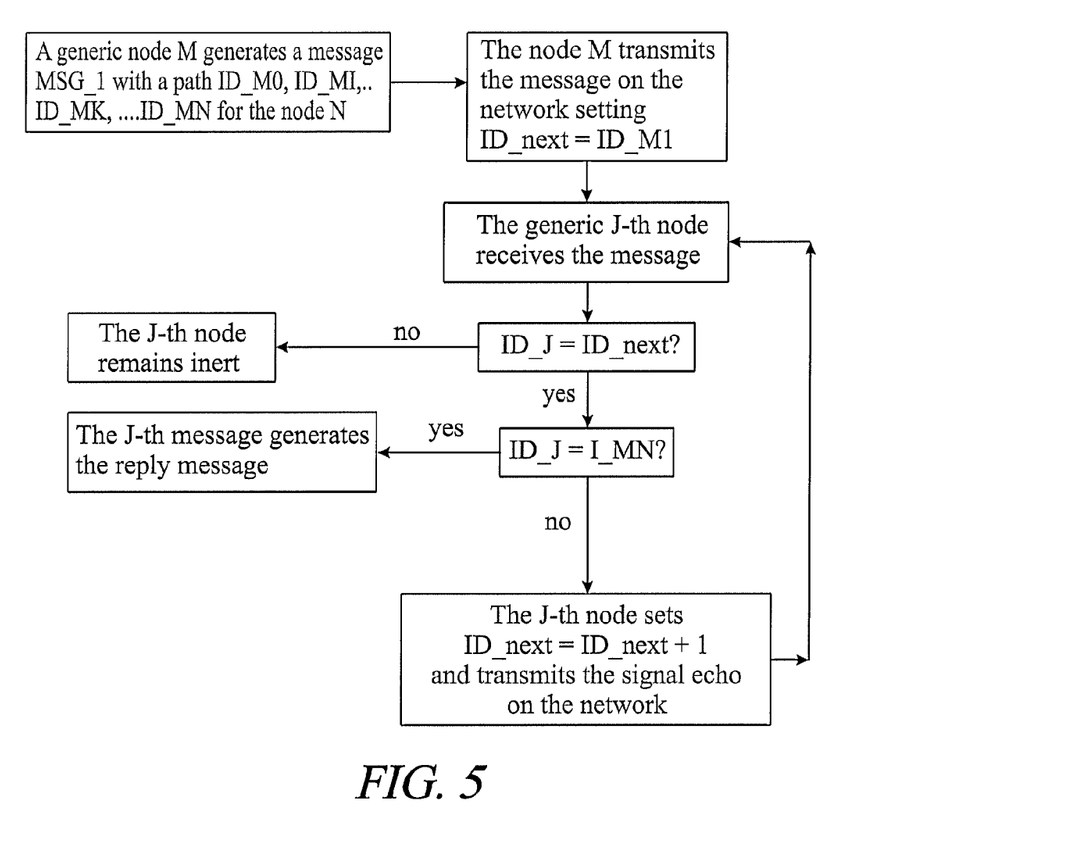
FIGS. 5 and 6 show flow diagrams illustrating the transmission protocol.

The general algorithm for transmission of the messages is described below with specific reference to the flow diagram of FIG. 5.

The generic node M generates a message intended for a generic node N. On the basis of the coverage equations of the network the processor of the node M defines the path that the message must follow to reach the recipient node. The description of the path, represented by a sequence of identification numbers of the nodes along the path, is incorporated in the message. Each node along the path defined in the message generates an echo of the signal towards the next node. In this way the section the message must cover before being regenerated by an echo is equal to the distance between two consecutive nodes along the path. However, if in certain operating conditions or in certain sections of the network the impedance is low, situations can occur in which the message emitted by a node reaches not only the first subsequent node along the path, but also more distant nodes along said path. In this case one or more nodes along the predefined path can be skipped.

With reference to the simplified network of FIG. 1 it is assumed that node UR1 must send a message to node UC15 via the path indicated by PH, defined by the coverage equations 5 and 6, containing the nodes UR1, UC13, UC14, UC15.

The message will therefore contain in the definition of the path the identification numbers

ID_UR1, ID_UC13, ID_UC14, ID_UC15 where the last identification number is that of the recipient of the message and the first identification number is that of the sender of the message. Before transmitting the message, the sender attributes to the field ID_next the value of the identification number of the nearest node along the path PH. In the example illustrated in FIG. 1, said value will be the identification number of the node UC13.

The message is transmitted on the network. A plurality of nodes will receive the message, according to the topology of the network and the impedance, variable according to the conditions prevailing on the network. Each generic J-th node (of which ID_J represents the identification number below) that receives the message falls into one of the following categories:

A. it is a node alien to the path;
B. it is a node of the path.

The processor associated with the node recognizes whether it is in the predefined path of the message or not by reading the data in the "MESSAGE PATH" section. If it is a node alien to the path, it must remain completely inert. Vice versa, if it is a node of the path, there are two possibilities:

The identification number of the J-th node is different from ID_next. The node remains inert;
the identification number of the J-th node which receives the message is equal to ID_next (ID_J=ID_next), i.e. it is the node of the path nearest the node that emitted the message. In this case the J-th node will generate a message which will be the echo of the message received or the response to the message received according to whether it is the recipient node of the message (ID_J=ID–N) or an intermediate node that acts as a "bridge".

The echo of the message consists in repetition of the message received, in which, moreover, the following substitution is performed ID_next=ID_next+1 i.e. in the echo of the message it is indicated that the next node that must be activated upon receipt of the message is the subsequent node in the path PH contained and described in the "MESSAGE PATH" section of the message. In practice, if the node that receives the message is the J-th node, the field ID_next of the message arriving will contain the identification number of the J-th node, i.e. will be ID_next=ID_J and the field ID_next of the echo will contain the value ID_next=ID_J+1.

In the echo of the message information can be incorporated or added if necessary by each node of the path, as will be clarified below, or the echo can be identical to the message received except for the increase in the identification number of the subsequent node along the path.

In the example of FIG. 1, the nodes UC1 and UC 13 are adjacent to the node UR1 that generated the message. The node UC1 remains inert, as it recognizes that it does not belong to the path. The node UC13 generates an echo since the node UR1 has set Cnext=ID_UC13.

Since the next node along the path PH is the node UC14, the echo of the message generated by the node UC13 will contain I_next=ID_UC14

If other nodes, such as nodes UC2, UC14 and UC12 receive the message generated by the node UR1, they remain inert, since the condition I_next=ID_j does not occur. In reality, the nodes UC2 and UC12 do not belong to the path PH and therefore must not generate an echo. The node UC14 belongs to the path. However, if it generated an echo there would be an overlapping of echoes on the line. Since it is not possible to know beforehand the depth of penetration of the message along the various branches of the network, using the algorithm described above avoids the generation of several echoes of the same message, at the cost of slowing down its penetration speed towards the destination node. Said speed would in fact be higher if, due to a particularly low line impedance, the message generated by UR1 penetrated directly along the path as far as the node UC14 or even UC15. The impossibility of knowing beforehand the penetration depth makes it advisable, to obtain a simple transmission control algorithm, to proceed as said in single steps, where each regeneration of the message by echo causes an advancement of only one node along the path.

The entire process described above is summarized in the block diagram of FIG. 5.

The N-th node marked by the identification number ID_N (in the example referring to FIG. 1 the node UC15) recognizes that it is the last in the list and therefore the recipient of the message. On the basis of the content of the message in the "MSG BODY" section, it will generate a reply message, in which the "MSG BODY" section contains the data requested by the message received. The path will be the same as the one followed by the message received, inverted. The transmission process is repeated in exactly the same way, simply inverting the sequence of the nodes in the path.

The recipient node can receive a message containing information or interrogation or any other useful element according to the type of management required on the network.

In the specific case of stray voltage monitoring, the end recipient of the message can be interpreted on the operating status of the control unit and the voltage of the related interconnection box, or the lamp post or other component connected to the control unit.

In the specific example described above with reference to the simple situation of FIG. 1 it has been assumed that the path described in the message is defined by the identification numbers of all the nodes between the collecting unit that generates the message and the recipient control unit.

This is the simplest transmission protocol implementation hypothesis, which does not take account of the greater or lesser difficulty of transmitting the message on the channel, typically the electricity distribution network. Given a recipient node of the message, the message always contains in this case a complete description of all the intermediate nodes between the unit that generates the message and the recipient control unit.

This is actually not necessary. On the basis of the line impedance conditions, the message generated by a collecting unit can reach not only the nearest node along the chosen path to reach the message recipient, but also for example the second or third node in order of distance. When this happens, because the transmission channel (for example and typically represented by the electricity distribution network) is particularly clean, the transmission process would be shortened if, in the description of the path, the message contained only the number of nodes strictly necessary.

In an improved embodiment of the transmission protocol according to the invention, the collecting unit(s) runs self-leaning or test cycles on the conditions of the transmission channel to check for example if it is possible to transmit a message skipping a certain number of nodes and reducing the number of echoes to be generated. For said purpose messages can simply be sent from the collecting unit to gradually more distant nodes, whose path description does not contain the intermediate nodes. Reference should be made again for example to the simplified diagram of FIG. 1 and of the path from the collecting unit UR2 to the control unit UC12. In the simpler form, implementation of the message addressed to this control unit will always contain the description of the path via the identification number of the control units UC8, UC9, UC10, UC11, UC12. If the system is implemented with the self-leaning function, the collecting unit UR2 can send a message to the node UC9 with a path defined only by the identification number of the control unit UC9. This message will be received and replied to by the node UC9 only if the latter is actually reached. The collecting unit UR2 is therefore able to establish whether the message sent to the control unit UC9 (or to another unit farther away) can skip the node UCS. Analogously a further test can be performed with a message addressed to the node UC10, which contains in the description of the path only the identification number UC9 and so on. Having ascertained, for example, that the control unit UC9 can be reached by skipping the node UC8, the collecting unit UR2 can send a message addressed to the control unit UC11 with a path described only by the identification. number of the unit UC9. If the unit UC11 provides a reply to said message, it means that the node UC10 can also be skipped and so on.

Repeating this control cycle on the conditions of the transmission channel and therefore on penetration of the message along a certain path, the collecting unit UR2 could for example detect that the message to the control unit UC12 can run a skipped path defined by the sequence of identification numbers of the units UC9, UC11, skipping units UC9 and UC10.

In an improved embodiment of the transmission protocol according to the invention, the collecting unit(s) runs self-leaning or test cycles on the conditions of the transmission channels to check for example, if it is possible to transmit a message skipping a certain number of nodes and reducing the number of echoes to be generated for said purpose messages can simply be set from the collecting unit to gradually more distant nodes, whose path description does not contain the intermediate nodes. Reference should be made again for example to the simplified diagram of FIG. 1 and of the path from the collecting unit UR2 to the control unit UC12. In the simpler form of implementation the message addressed to this control unit will always contain the description of the path via the identification number of the control unit UC8, UC9, UC10, UC11, UC12. If the system is implemented with the self-learning function, the collecting unit UR2 can send a message to the node UC9 with a path defined only by the identification number of the control unit UC9. This message will be received and replied to by the node UC9 only if the latter is actually reached. The collecting unit UR2 is therefore able to establish whether the message sent to the control unit UC9 (or to another unit farther away) can skip the node UCS. Analogously a further test can be performed with a message addressed to the node UC10, which contained in the description of the path only the identification number UC9 and so on. Having ascertained, for example, that the control unit UC9 can be reached by skipping the node UC8, the collecting unit UR2 can send a message addressed to the control unit UC11 with a path described only by the identification, number of the unit UC9. If the unit UC11 provides a reply to said message, it means that the node UC10 can also be skipped and so on.

Repeating this control cycle on the conditions of the transmission channel and therefore on penetration of the message along a certain path, the collecting unit UR2 could, for example, detect that the message to the control unit UC12 can run a skipped path defined by the sequence of identification numbers of the unit UC9, UC11, skipping units UC9 and UC10.

This embodiment, however, maintains the concept that the message addressed by a collecting unit UR2 to a control unit UC contains the defined path that the message (and consequently the reply to it) must follow. The control units do not have to perform any operation and do not have to choose in anyway the path to be followed by the message.

The messages that can be transmitted through the network can be of various types. The following three messages can be typically used for management of the network.

"Train" type messages run along a path PH from the first to the last node defined in the message, and return to the first node which is typically a collecting unit UR. Each time the message passes from one node to the next one along the path, the bridge node that generates the echo (at outward or return transmission) does not only increment the value of ID_next but adds to the message in transit significant information on its status. For example, in this type of "train" message, an information bit or byte can be assigned to each node of the path. In the case of application to the monitoring of stray voltage, each control unit combined with the nodes of the path defined in "MESSAGE PATH" enters in the message regenerated via echo a datum which indicates whether the respective interconnection box is at a voltage above or below a danger threshold. For said purpose it is sufficient to provide one information bit for each node, said bit taking on the two values "0" or "1" according to the condition of the node. The bit can be contained right from the beginning of the message, for example in the "MSG BODY" section, or can be added by each node, lengthening the "MSG BODY" section.

In this type of message, each node that generates the echo must also recalculate the validation code CRC, since the echo of each message is not identical to the message received in input and therefore the validation is possible only if the CRC is recalculated each time.

"Interrogation" type messages: the function of this type of message is to reach a node without collecting information from the intermediate nodes along the path. This type of message is used to recover or deliver functional parameters from or to the message destination node. The transmission mode is the one already described with reference to FIG. 5.

Alarm messages: when one of the nodes in which the control units are arranged detects an alarm situation which must be signaled immediately, instead of waiting to be interrogated by the subsequent "train" type or "interrogation" type message, it immediately generates an alarm signal, which is addressed to the collecting unit to which the node, i.e. the related control unit is assigned. The message is addressed by indicating as the path the one followed by the last message which said node has received from the collecting unit. Alternatively, the alarm message can contain a description of a different path, which the control unit has "seen" pass, for example a message that has passed through the node to which the control unit belongs, but addressed to a different node. In theory, the alarm message can also be sent along a path that leads to a different collecting unit from the one to which the node that generates the alarm signal is assigned, since the aim of this type of message is to be sent as soon as possible to the control center to which the collecting units are connected.

In this way the alarm signal reaches the collecting unit very quickly, even if the individual nodes are interrogated at long intervals.

Basically two fault situations can occur:

fault in a collecting unit;

fault in a control unit.

The first type of fault is detected directly by the control center to which the collecting units are connected, for example via the lack of a communication signal. When this happens, in order for the control units of the nodes combined with the faulty collecting unit to remain connected and correctly monitored, they are re-assigned to the collecting unit to which they had been assigned secondarily or subordinately. For example, in the case of the simplified network of FIG. 1, if a fault occurs in the collecting unit UR1, the nodes UC1, UC2, UC3, UCS, UC13, UC14, UC15, UC16 assigned to it will be temporarily re-assigned to the collecting unit UR2 until operation of node UR1 is restored. In this case it is an unavoidable choice, as there are only two collecting units. When the network is more complex, the coverage list assigned to a collecting unit in which a fault occurs can be re-assigned to a collecting unit chosen from among the many others that are present in the network. Alternatively, the coverage list can be divided and re-assigned partly to one and partly to the other of several collecting units.

The collecting units can receive in the programming phase all the collection lists so that in the event of a fault it is easy to transmit a message from the control center, in which the various collecting units operating which must compensate for the temporary fault are informed of this circumstance, so that they begin to manage the control units temporarily re-assigned to them.

The failure or temporary impossibility of reaching a node represented by a control unit along the path may not prevent the message reaching the end recipient, i.e. the last node in the path. This occurs when from the node preceding the faulty one, the message manages to penetrate as far as the second subsequent node. If this does not happen, however, for example due to the presence of a high impedance or because two consecutive nodes along the path are faulty, the message does not reach its final destination and the collecting unit that emitted it must receive consequent information. Information must be generated also when the final node is reached despite the fault in an intermediate node.

Figure 6:
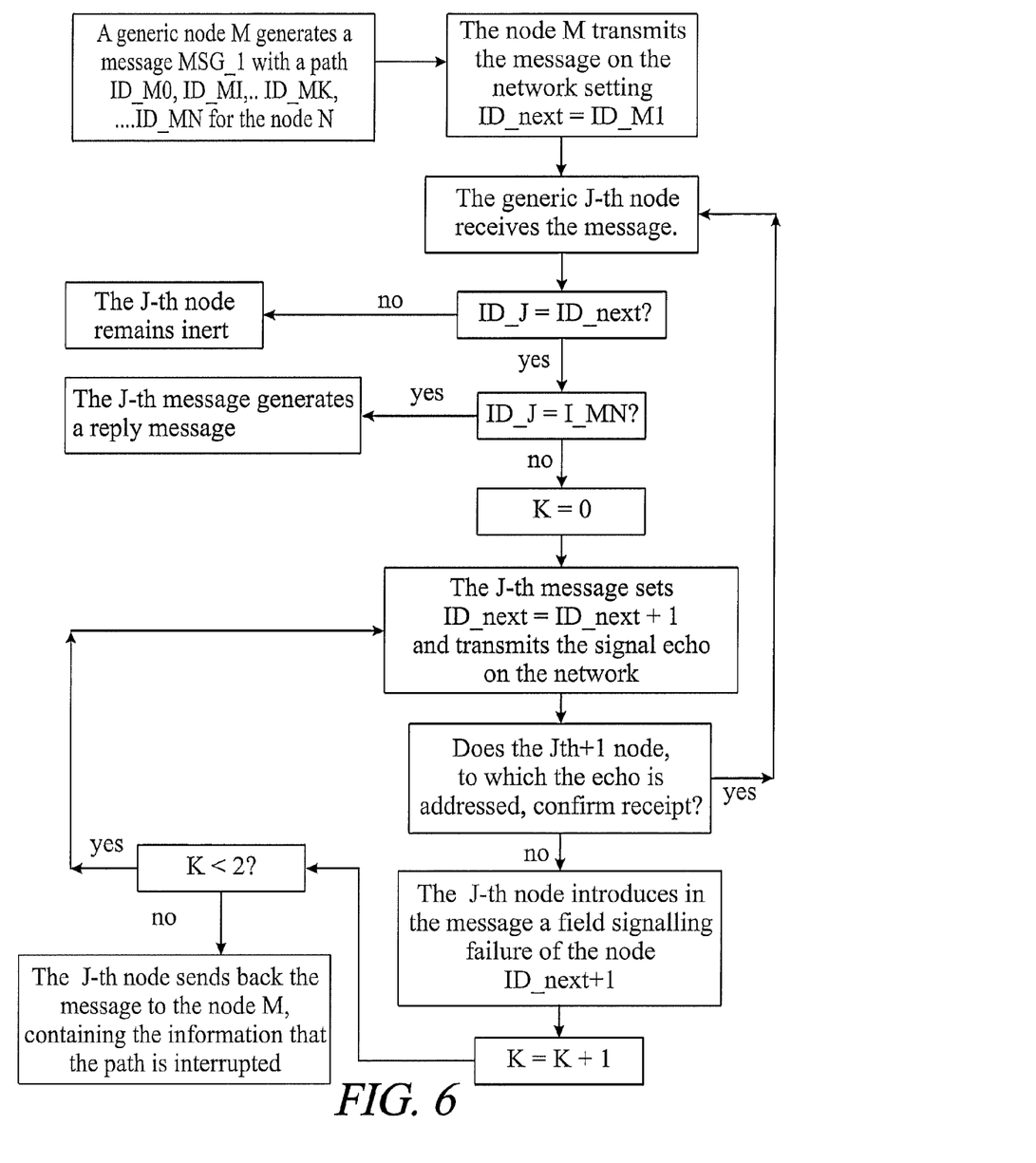

FIG. 6 shows the algorithm that performs this check and which permits attempt at transmission beyond the faulty node, signaling the abnormal situation and/or impossibility of reaching the final node to the collecting unit that generating the message. The block diagram is partly equal to that of FIG. 5, since the parts relating to checking of the fault and to the fault transmission attempt have been added, while transmission in regular operating conditions follows the same diagram as FIG. 5.

Basically, the J-th node than receives the message the echo of which it must send to the next node according to the path entered in the MESSAGE PATH section of the message, sends: the message on the network. The following node that correctly receives the message generates an echo of it according to the procedure already described. This echo which is received back also by the J-th node, can be considered a confirmation of reception of the message regenerated by the echo of the J-th node and transmission to the node in position ID_next. If this confirmation is not received by the J-th node, the situation is interpreted as a fault or an interruption at the level of the node following the J-th node in the message path.

The J-th node introduces into the message information concerning this situation and attempts to transmit the same message, generating a new echo, to the second subsequent node, skipping the one that has not replied. This transmission attempt involves changing the identification number ID_next, incrementing it by one, so that the node that must receive it is the second and not the first node subsequent to the J-th node along the path defined in "MESSAGE PATH".

If the interrupted or faulty node can be skipped, the second subsequent node transmits an echo of the message that represents for the J-th node a confirmation of reception. At this point the message continues its normal path as far as the destination node. The only difference with respect to the situation of no fault on the node subsequent to the J-th node is information in the message which will be received by the node M in the return phase. This permits transmission of a fault signal to the control center and allows the collecting unit to modify the path to avoid the faulty node passing through a non-faulty series of other nodes according to a different connection, i.e. constructing a new sequence in "MESSAGE PATH" via the coverage equations. For example, if in the diagram of FIG. 1 the node UC14 were faulty, in the following message addressed to the node UC15 the collecting unit UR1 could use the path UC1, UC2, UC3, UC15, skipping the faulty node.

If also the second node following J-th the node does not respond because it is faulty or because the message regenerated by the echo of the J-th node does not manage to reach a sufficient penetration depth, the J-th node does not receive confirmation of reception. When two consecutive nodes are faulty, the J-th node retransmits the message to the node M that has generated it, with information on the double interruption, In the diagram of FIG. 6 the counter K has the function of limiting there-transmission attempt to two consecutive nodes, since otherwise the J-th node would continue in its transmission attempts to other subsequent nodes.

It is understood that the drawing only shows a practical embodiment of the invention, which can vary in its forms and arrangements, without moreover departing from the scope of the concept underlying the invention. Any presence of reference numbers in the following claims has the sole aim of facilitating the reading thereof in the light of the description and the drawings and does not in any way limit the scope of the protection.

Thus, although there have been described particular embodiments of the present invention of a new and useful Method for Transmission of Information Between Nodes of a Network and Network Using Said Method it is not intended that such references be construed as limitations upon the scope of this invention except as set forth in the following claims.

What is claimed is:

1. A method for communication between nodes of a network interconnected by a transmission channel and wherein each node is identified by a node identification number, the method comprising:
   (a) at least one transmitter node emitting at least one message to at least one message recipient node wherein the transmitter node originates the message and the message recipient node represents a final destination for the message;
   (b) said message when originated and emitted by the transmitter code comprising a description of a path between said transmitter node and said message recipient node, said path being defined by the transmitter node that originates and emits the message, via a sequence of node identification numbers along said path;
   (c) the nodes of the path regenerate the message by sending it to the next node defined by said path stored in the message;
   (d) each node that receives a message from a node preceding it along said path sends a confirmation of reception of the message to said node preceding it;
   (e) when a node does not receive a message of confirmation to its own message addressed to the subsequent node along the path, it makes at least one attempt at transmission of said message to the node which, in said path, is subsequent to the node from which the confirmation message has not been received;
   (f) wherein each of said messages comprises an identification number of each subsequent node along said path to which the message must be transmitted, said identification of the subsequent node identifying to which node of the path defined in the message said message must be transmitted;
   (g) when a message recipient node receives said message, it generates a reply message to the node that emitted the message and containing a description of the path from the node that receives the message to the node that has emitted the message received;
   (h) when a node different from the message recipient node receives a message with a subsequent node identification number different from its own identification number, said node remains inert; and
   (i) when a node receives a message in which the identification number of the subsequent node corresponds to its own identification number, it generates an echo of the message, replacing the subsequent node identification number with the identification number of the following node in the sequence of node identification numbers defining said complete message path in said message; and
   wherein said messages comprise control message of all the nodes along the path between a node emitting the message and the message recipient node, said control messages being modified by each node along the path, with the addition of at least one datum relating to a condition of each node along said path, and wherein the said datum added by each node to said control message is stored and delivered to the message recipient node.

2. A method for communication between nodes of a network interconnected by a transmission channel and wherein each node is identified by a node identification number, the method comprising:
   (a) at least one transmitter node emitting at least one message to at least one message recipient node wherein the transmitter node originates the message and the message recipient node represents a final destination for the message;
   (b) said message when originated and emitted by the transmitter code comprising a description of a path between said transmitter node and said message recipient node, said path being defined by the transmitter node that originates and emits the message, via a sequence of node identification numbers along said path;
   (c) the nodes of the path regenerate the message by sending it to the next node defined by said path stored in the message;
   (d) each node that receives a message from a node preceding it along said path sends a confirmation of reception of the message to said node preceding it;
   (e) when a node does not receive a message of confirmation to its own message addressed to the subsequent node along the path, it makes at least one attempt at transmission of said message to the node which, in said path, is subsequent to the node from which the confirmation message has not been received;
   (f) wherein each of said messages comprises an identification number of each subsequent node along said path to which the message must be transmitted, said identification of the subsequent node identifying to which node of the path defined in the message said message must be transmitted;
   (g) when a message recipient node receives said message, it generates a reply message to the node that emitted the message and containing a description of the path from the node that receives the message to the node that has emitted the message received;
   (h) when a node different from the message recipient node receives a message with a subsequent node identification number different from its own identification number, said node remains inert; and
   (i) when a node receives a message in which the identification number of the subsequent node corresponds to its own identification number, it generates an echo of the message, replacing the subsequent node identification number with the identification number of the following node in the sequence of node identification numbers defining said complete message path in said message;
   (j) providing a plurality of collecting nodes and a plurality of control nodes; and dividing said control nodes into a plurality of groups, each group comprising a series of control nodes, each group being assigned to a collecting node and the collecting node interrogating via said messages the control node to collect information from said control nodes; and
   wherein each control node of a group is also assigned to an additional collecting node and wherein in the absence of faults on the collecting node, the control node of each group communicate with the respective main collecting node to which they are assigned; and in the event of a fault on said main collecting node, the control node assigned to it are re-assigned each to the respective additional collecting nodes.

3. The method of claim 2, wherein the path of the message is defined by a collecting node, and wherein a control node which must send a reply to a message received from a collecting node uses a path defined in one of the messages received from said collecting node.

4. The method of claim 2, further comprising representing said network via a series of coverage equations, each of which define a sequence of control nodes connected to one another and to a collecting node, and which represent the topological description of said network.

5. The method of claim 2, wherein when a collecting node detects a fault it generates an alarm message which contains an identification number of the recipient identification number of a collecting node to which said control node is assigned which emits the alarm message and as description of the path, the description of the path contained in at least one message received from said node.

6. The method of claim 2, wherein said collecting node performs test cycles on the condition of the connection lines with a control node assigned to it to verify the depth to which a message can penetrate along the path that joins a plurality of said control nodes.

7. The method of claim 6, wherein the path of a message addressed to a recipient node is determined by the collecting node at least partly on the basis of the condition of the portion of line that join said collecting node to said recipient node.

8. The method of claim 2, wherein the path between a transmitter node and a message recipient node is defined by the sequence of identification numbers of all of the nodes positioned between the transmitter node and the recipient node.

* * * * *